(12) United States Patent
Hansen et al.

(10) Patent No.: US 12,234,675 B2
(45) Date of Patent: Feb. 25, 2025

(54) SAFETY DOOR ASSEMBLY

(71) Applicant: Siemens Gamesa Renewable Energy A/S, Brande (DK)

(72) Inventors: Holger Kempf Hansen, Ejstrupholm (DK); Emma Sofie Marquart Loeber, Vejle (DK); Jeferson Luiz Villalta, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/094,139

(22) Filed: Jan. 6, 2023

(65) Prior Publication Data
US 2023/0228134 A1 Jul. 20, 2023

(30) Foreign Application Priority Data
Jan. 14, 2022 (EP) .................................... 22151556

(51) Int. Cl.
*E05C 7/06* (2006.01)
*E06B 3/36* (2006.01)
*E06B 3/42* (2006.01)

(52) U.S. Cl.
CPC .................. *E05C 7/06* (2013.01); *E06B 3/36* (2013.01); *E06B 3/42* (2013.01)

(58) Field of Classification Search
CPC . F03D 1/101; F03D 1/125; F03D 1/00; F03D 80/50; F05B 2240/14; F05B 2240/142; F05B 2240/916
See application file for complete search history.

(56) References Cited

U.S. PATENT DOCUMENTS

| | | | | |
|---|---|---|---|---|
| 2014/0030111 | A1* | 1/2014 | Kohne | F03D 13/20 416/244 R |
| 2016/0102493 | A1* | 4/2016 | Pollmann | E06B 1/6046 52/784.1 |
| 2019/0226460 | A1* | 7/2019 | Madsen | F03D 80/50 |
| 2021/0156366 | A1* | 5/2021 | Munk-Hansen | F03D 80/50 |
| 2022/0341401 | A1* | 10/2022 | Frydkjaer | F03D 80/00 |

FOREIGN PATENT DOCUMENTS

| | | |
|---|---|---|
| CN | 208980153 U | 6/2019 |
| WO | 2021063646 A1 | 4/2021 |

OTHER PUBLICATIONS

"Hatch and fence solution for wind turbine nacelle", Nov. 4, 2016, ip.com (Year: 2016).*

* cited by examiner

*Primary Examiner* — Woody A Lee, Jr.
*Assistant Examiner* — Cameron A Corday
(74) *Attorney, Agent, or Firm* — Schmeiser, Olsen & Watts LLP (57) ABSTRACT

A safety door assembly for a hoist window of a structure includes a sliding door arranged to reveal or conceal the hoist window; and a barrier assembly which is closed to inhibit access to an area in front of the hoist window or opened to permit access to the area in front of the hoist window; and wherein the barrier assembly is adapted to prevent the sliding door from revealing the hoist window when the barrier assembly is open; and the sliding door is adapted to prevent opening of the closed barrier assembly when the sliding door reveals the hoist window.

16 Claims, 14 Drawing Sheets

SAFETY DOOR ASSEMBLY

CROSS-REFERENCE TO RELATED APPLICATIONS

This application claims priority to EP Application No. 22151556.2, having a filing date of Jan. 14, 2022, the entire contents of which are hereby incorporated by reference.

FIELD OF TECHNOLOGY

The following relates to a safety door assembly.

BACKGROUND

In a tall structure such as a wind turbine, a tall building, a lighthouse etc., it may at some stage be necessary to carry out a load-lifting procedure at an upper level of the structure. For example, during a wind turbine installation procedure or during a maintenance procedure, a heavy object such as a generator component, an auxiliary device, etc. may need to be lifted to the height of the nacelle or canopy and then maneuvered into the interior. Equally, a heavy object may need to be maneuvered from the nacelle or canopy to the exterior and then lowered to ground level or, in the case of an offshore wind turbine, to the deck of a marine vessel. To this end, the canopy of a wind turbine generally has one or more access openings such as an access hatch or access window which can be opened to allow a load to be lifted in or out.

It is very important to ensure the safety of any person in the vicinity of the opened hatch or window. Particularly at a great height such as at the top of a wind turbine tower, wind gusts can present a significant hazard to personnel near any open hatch or window. Therefore, safety regulations may stipulate that personnel wear a harness connected by rope to some fixed point in the interior to prevent anyone falling out of an opened hatch or window. However, in the confined interior of a wind turbine canopy, the need to wear a harness can make it difficult to move around and to operate a crane or hoist. The need to wear a harness may add multiple additional steps to the overall procedure, so that installation and maintenance become more time-consuming and also more costly.

SUMMARY

An aspect relates to provide a solution to the problem described above.

The safety door assembly shall be understood to be provided for a hoist window in an essentially vertical wall of a structure such as a wind turbine, a lighthouse, or any tall building. The safety door assembly serves to reduce or eliminate the risk of a person falling through the opened hoist window.

According to embodiments of the invention, the safety door assembly comprises a sliding door arranged to reveal or conceal the hoist window; and a barrier assembly which can be closed to inhibit personnel access to an area immediately in front of the hoist window, or opened to permit access to the area in front of the hoist window. The barrier assembly is adapted to prevent the sliding door from revealing the hoist window when the barrier assembly is open; and the sliding door is adapted to prevent opening of the closed barrier assembly when the sliding door reveals the hoist window.

In the inventive safety door assembly, the sliding door cannot open unless the barrier assembly is closed: in other words, without the barrier in place, it is not possible to open the hoist window. Equally, the barrier assembly cannot be opened unless the sliding door is closed: in other words, the opened sliding door makes it impossible to remove the barrier from the area in front of the hoist window. The inventive safety door assembly may therefore be regarded as an interlocking system, since each of the barrier assembly and sliding door prevents the other from being moved to a potentially hazardous position.

The inventive safety door assembly is essentially an interlocking guard system that makes it very difficult or even impossible for a technician or other personnel to unintentionally be present in front of the opened hoist window. The open/shut states of the sliding door are linked to open/shut states of the barrier in such a way that a technician must perform a certain sequence of actions in order to be able to open the hoist window, and can ultimately only actuate the sliding door to reveal the hoist window when he is no longer standing in front of the hoist window.

The area in front of the hoist window can be a small platform on which a load can be placed during a hoisting maneuver. Equally, the area in front of the hoist window can be part of a larger platform or passageway. Because personnel are at risk of injury or accident when standing in this area when the hoist window is open, the area immediately in front of the hoist window may be referred to in the following as the "hoist window hazard zone". The inventive safety door assembly ensures that a technician cannot be present in this hazard zone when the hoist window is open, by making it necessary for the technician to move outside of the hoist window hazard zone in order for the hoist window to be opened.

An advantage of the inventive safety door assembly is that the risk of injury or accident is very favorably reduced, so that personnel in the vicinity of the hoist window during a load hoisting maneuver need not wear a safety harness and can move about unhampered by such restrictions. The duration and expense of any service, maintenance or repair procedure being carried out can therefore be favorably reduced.

According to embodiments of the invention, the wind turbine comprises a canopy mounted at the top of a tower and enclosing components of the wind turbine; a number of rotor blades mounted to a hub at the front of the canopy; a hoist window to facilitate transfer of loads into and out of the wind turbine, and an embodiment of the inventive safety door assembly for the hoist window.

As indicated above, the inventive safety door assembly can be deployed in any structure with a hoist window at a hazard-related height for the transfer of loads into or out of the structure.

According to embodiments of the invention, the method of performing a hoisting procedure in such a structure comprises the steps of:
  A) closing the barrier assembly to inhibit personnel access to the hazard area;
  B) actuating the sliding door to open the hoist window;
  C) operating a lifting apparatus to transfer a load through the opened hoist window;
  D) actuating the sliding door to close the hoist window; and
  E) opening the barrier assembly to permit personnel access once again to the hazard area.

In the following, it may be assumed that the structure with the hoist window(s) is a wind turbine, which can reach a height of 80 m or more. A hoist window in the side of the wind turbine canopy can therefore be at a height of 80 m or higher above ground or sea level, and it is mandatory to ensure the safety of personnel in the vicinity of any such opened hoist window, which may also be referred to as a service hatch, a transfer hatch, etc. The components requiring replacement and service procedures may be mostly arranged inside the canopy (the terms "canopy" and "nacelle" may be regarded as synonyms). In an exemplary embodiment of the invention, a wind turbine may comprise a number of hoist windows, each being an aperture or opening in an essentially vertical side wall of the canopy (the term "essentially vertical" does not exclude that the wall containing the hoist window can be slanted, curved, etc.), and a safety door assembly for each such hoist window. Other components may be installed at an upper level of the tower. Equally, it may be preferred to move components into or out of the canopy through the tower. In a preferred embodiment of the invention therefore, the wind turbine comprises a hoist window at an upper level of the tower, and a safety door assembly for that hoist window. A wind turbine may also have a hoist window in the hub to allow components to be lifted into or out of the hub or spinner. For example, a hoist window may be provided in the flat front face of a hub, or in the curved side wall of a hub, depending on the hub design and geometry. The wind turbine also comprises a safety door assembly for such a hoist window in the hub. The sliding door and barrier assembly may be configured to allow the hoist window to open for any rotational position of the hub. Alternatively, the sliding door and barrier assembly may be configured to allow the hoist window to open when the hub is in a specific rotational position.

The area immediately in front of the hoist window may be at a raised level. For example, a raised passageway, platform or walkway may be provided along a section of the canopy side wall, and personnel may use this passageway to move about inside the canopy. In an exemplary embodiment of the invention, the width of the passageway corresponds to the width of the barrier assembly in its closed state. In other words, when the barrier assembly is closed, the area immediately in front of the hoist window is closed off and personnel cannot pass in front of the hoist window.

There are various possible ways of constructing and realizing the barrier assembly. For example, the barrier assembly may be constructed to retract below the level of the passageway when in its "open" state, i.e. in a state that allows personnel to move in an unobstructed manner in front of the closed hoist window, and to be raised upwards when the hazard area is to be closed off. Alternatively, the barrier assembly may be constructed to be raised to a height above the hoist window when in its open state so that personnel can move freely in front of the closed hoist window, and to be lowered into place on a passageway or walkway when the hazard area is to be closed off. In either of these realizations, it shall be understood that the open barrier assembly acts to keep the sliding door closed (the sliding door can only open when the barrier assembly is closed); and the open sliding door acts to keep the barrier assembly closed (the barrier assembly can only open when the sliding door is closed).

In a particularly preferred embodiment of the invention, the barrier assembly comprises a pair of barriers arranged on either side of the hoist window. The barriers are independently operable. In one possible embodiment, each barrier is mounted to a supporting structure or framework which also supports the sliding door. For example, the supporting structure may comprise an essentially rectangular frame and track that allows the sliding door to slide freely between its closed position (concealing the hoist window opening) and its open position (revealing the hoist window opening). One barrier may be mounted to the left-hand side of the frame, and the other barrier may be mounted to the right-hand side of the frame. For example, the supporting structure can comprise a vertical post on each side, and each barrier can be rotatably mounted to such a post. In an exemplary embodiment of the invention, each barrier can swing through one quarter-turn from its open position to its closed position. Preferably, a barrier extends across a passageway or walkway when closed, and comprises a latch mechanism to engage with a fixed structure during its closed state. For example, each of the two barriers described above may be equipped with a latch that can engage with a handrail present along the outer edge of the passageway.

The sliding door may be equipped with a mechanical and/or magnetic and/or electrical actuating means. In a particularly preferred embodiment of the invention, the actuating means of the sliding door is arranged to be inaccessible, i.e. physically unreachable, to a person in front of the hoist window. This means that to open or close the sliding door, a person must be outside the hazard area. In a particularly preferred embodiment of the invention, the sliding door actuating means is realized as a lever which, when raised, allows the sliding door to be moved to reveal the hoist window. The lever can be arranged at the outer side of the closed sliding door so that it can only be reached by a person standing outside of the hazard area.

Because of the location of the actuating mechanism, even when the barrier assembly has been actuated to close off the passageway, it is not possible for a person standing within the closed barrier assembly to open the sliding door. In order to reach the actuating mechanism, that person must be outside the hazard zone, for example that person cannot be in the area between the two barriers of the barrier assembly described above.

Components of the inventive safety door assembly may be actuated manually, by an electronic control means, or using any suitable mode. For example, an additional level of safety may be provided by only permitting trained personnel to actuate the safety door assembly using authorization such as a key card, and a suitable card reader may be installed in the vicinity of the hoist window. Alternatively or in addition, a dedicated tool may be required to operate the actuating means of the sliding door and/or to actuate a barrier of the barrier assembly.

BRIEF DESCRIPTION

Some of the embodiments will be described in detail, with reference to the following figures, wherein like designations denote like members, wherein.

DETAILED DESCRIPTION

Figure 1:
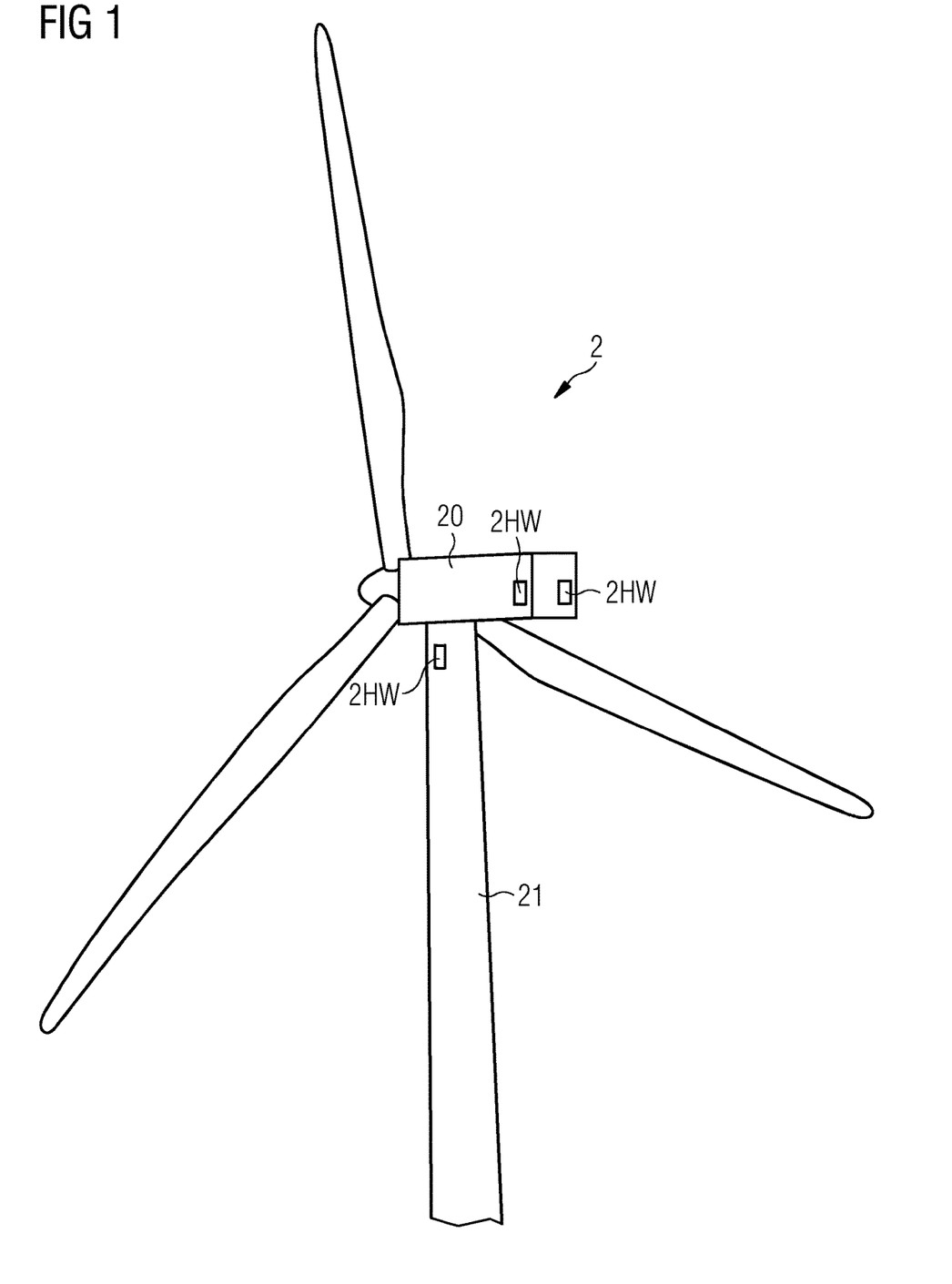
FIG. 1 shows a wind turbine with a number of hoist windows.

FIG. 1 shows a wind turbine 2 with a number of hoist windows 2HW. One hoist window 2HW is provided in a side wall of the canopy 20, and another possible position for a hoist window is indicated at the rear of the canopy 20. The position of another possible hoist window 2HW is indicated near the top of the tower 21. It is important to ensure that a person inside the canopy (or tower) is not exposed to any risk of falling through an open hoist window 2HW.

Figure 2:
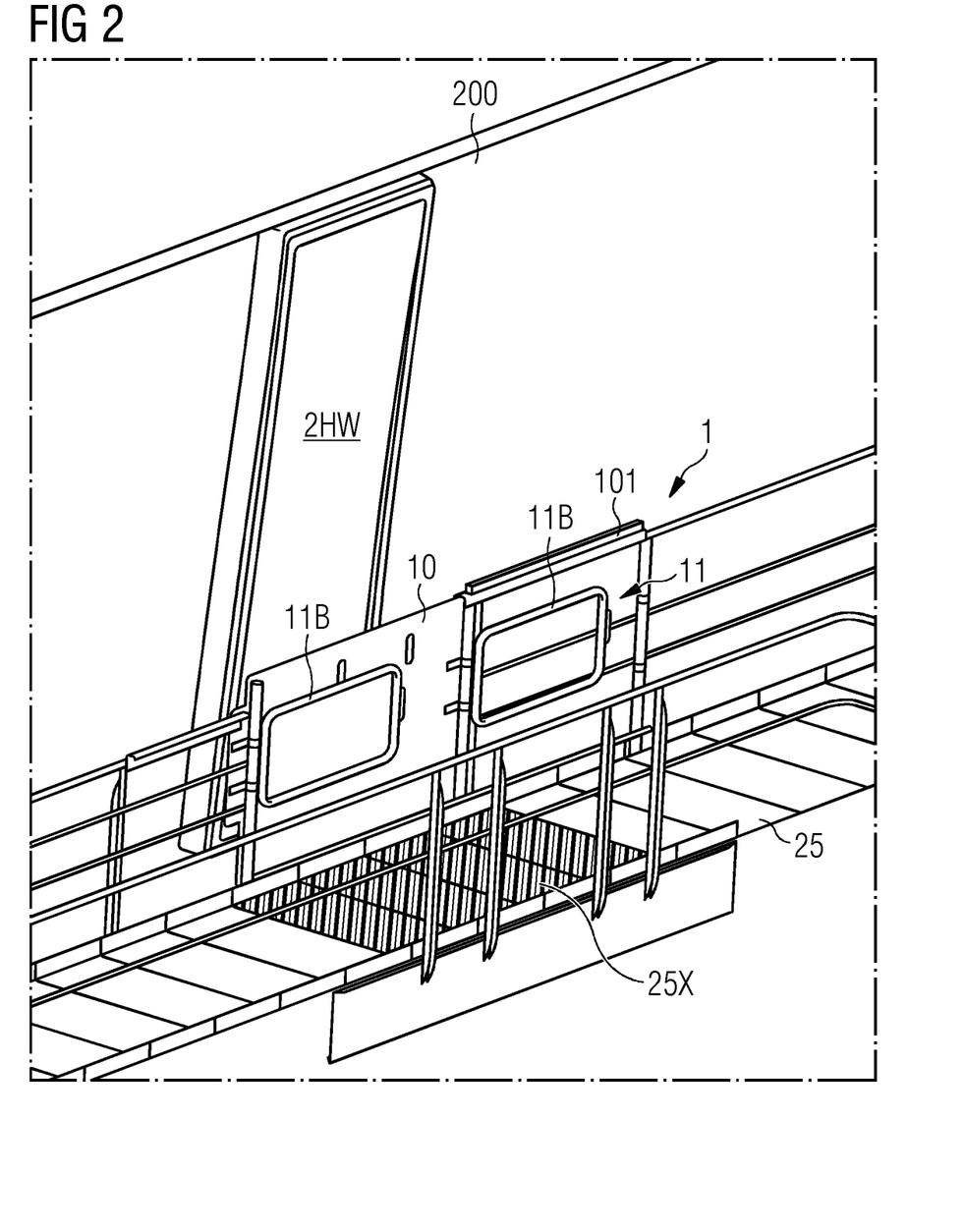
FIG. 2 shows an embodiment of the safety door assembly prior to a hoisting procedure.

FIG. 2 shows an embodiment of the inventive safety door assembly 1 prior to a hoisting procedure. The diagram shows a sliding door 10 in its closed position, i.e. in a position that closes off the hoist window 2HW (shown here as an aperture in a section of the canopy wall 200). The diagram also shows two barriers 11B of a barrier assembly 11. The barriers 11B are both open, and permit personnel to freely move about in front of the closed hoist window 2H. In this exemplary realization, a passageway 25 or walkway 25 runs along the canopy wall, and installation of the safety door assembly 1 makes use of structural elements of the passageway 25. A hazard area 25X in front of the hoist window 2HW is indicated. It is important to ensure that no personnel is present in this particularly dangerous area 25X during a hoist maneuver.

Figure 3:
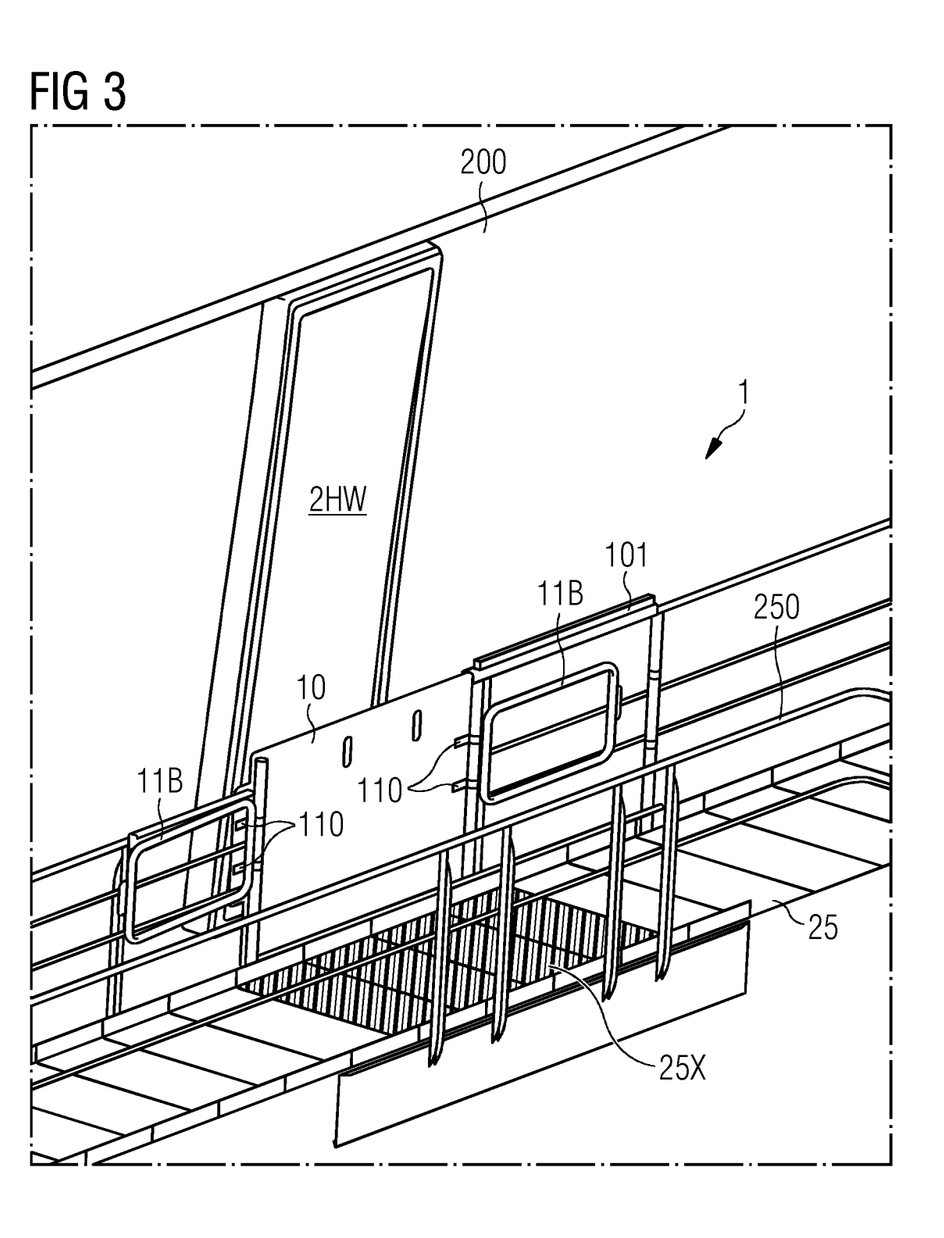
FIG. 3 shows another embodiment of the safety door assembly prior to a hoisting procedure.

FIG. 3 shows another embodiment of the inventive safety door assembly 1 prior to a hoisting procedure. Here also, a sliding door 10 is in its closed position and closes off a hoist window. The diagram also shows two barriers 11B of a barrier assembly 11, configured in this case to open in opposite directions, i.e. the left-hand barrier opens to the left, and the right-hand barrier opens to the right. In this diagram, the two barriers 11B are both open, and permit personnel to freely move along the passageway 25. A hook-shaped "parking lock" 110 is provided for each barrier 11B and is shown in more detail in FIG. 12. This hook-shaped mechanism allows the barrier to engage with the supporting framework 13 of the safety door assembly 1. This mechanism also prevents the sliding door 10 from being opened when a barrier is open (in its "parking" position to allow free passage); equally, this mechanism prevents a barrier from being opened as long as the sliding door 10 is open.

Figure 4:
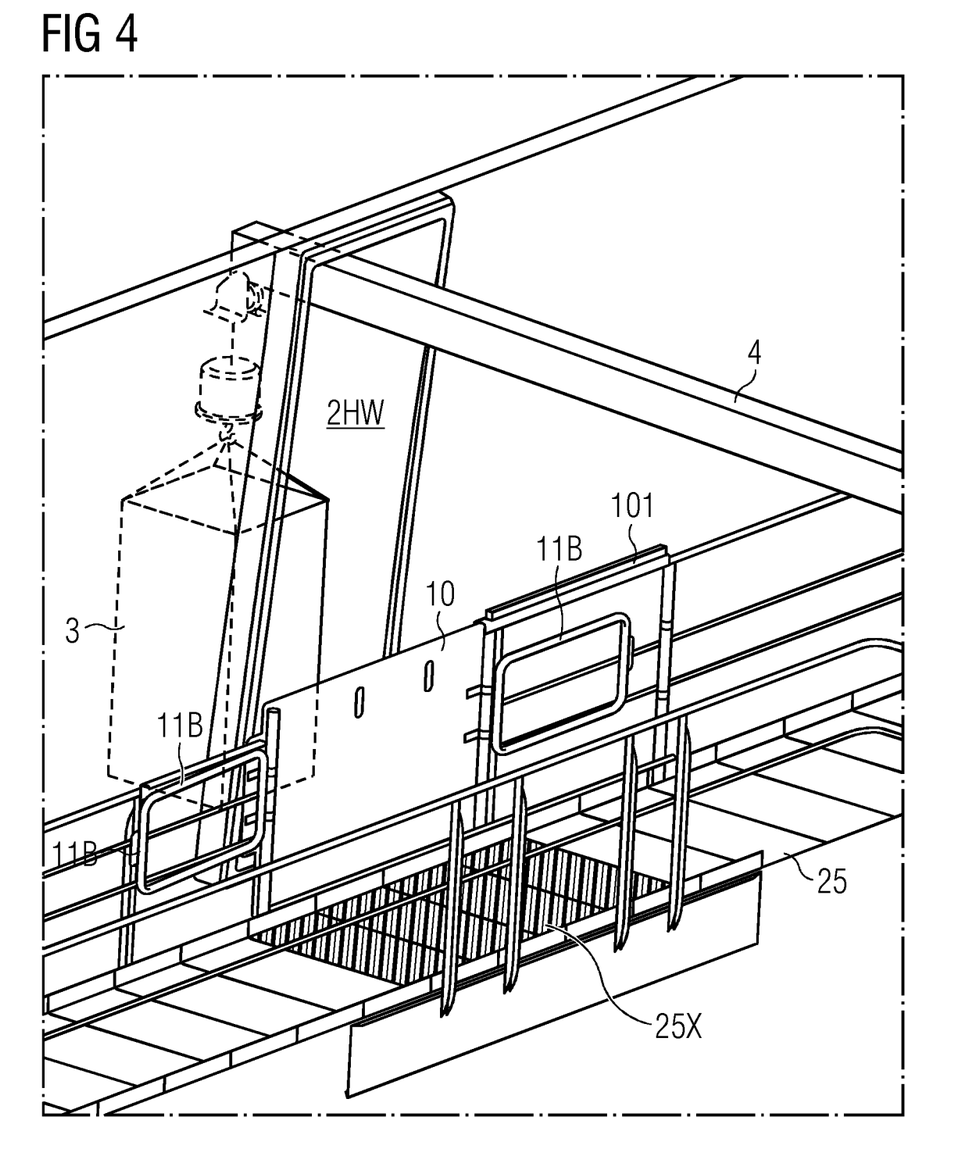
FIG. 4 shows a stage of the method during a hoisting procedure.

FIGS. 4-12 show various stages of the inventive method during a hoisting procedure. The description relates to the safety door assembly of FIG. 3. As shown in FIG. 4, a load 3 can be lifted into place outside the hoist window 2HW using a davit crane 4 installed inside the canopy 20. In a subsequent step shown in FIG. 5 and FIG. 6, an operator 5 has turned both barriers 11B to their closed position. The first barrier 11B (to the left of the hoist window) is closed by manually actuating a spring-loaded latch to release the barrier 11B from its "parked" position. A similar spring-loaded latch can be actuated to release the second barrier 11B (to the right of the hoist window) from its "parked" position.

Figure 5:
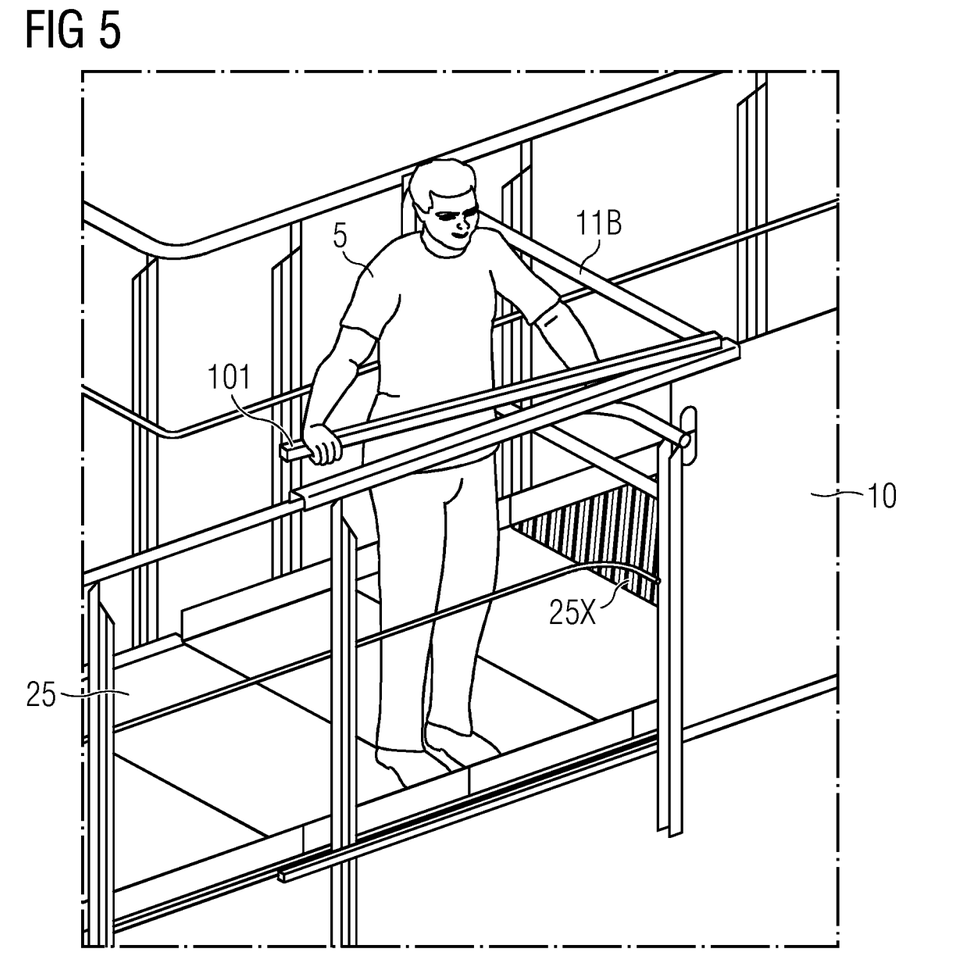
FIG. 5 shows another stage of the method during a hoisting procedure.
Figure 6:
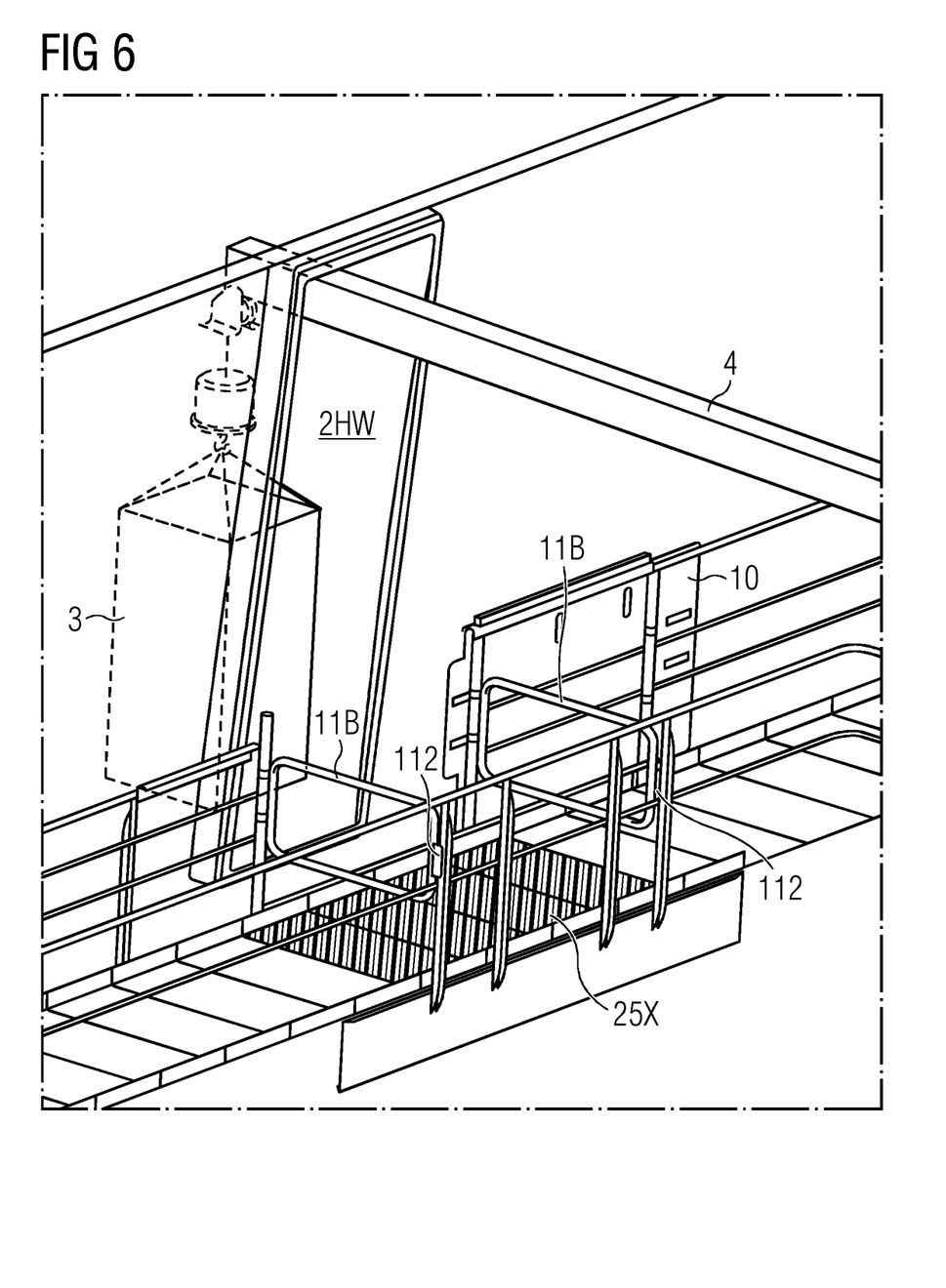
FIG. 6 shows another stage of the method during a hoisting procedure.

Each barrier 11B has a latch 112 that automatically engages with a handrail 250 of the walkway 25. To any person on the passageway 25, it is immediately obvious that the hazard area 25X is closed off. As shown in FIG. 5, the operator 5 actuates a release mechanism 101 of the sliding door 10. In this embodiment, the release mechanism 101 is a long lever which can only be raised when the operator 5 is in a position to the side of the hoist window 2HW, since the release mechanism 101 is constructed to be inaccessible from within the closed barrier assembly 11. In other words, from a position in the hazard area 25X, the operator 5 cannot reach or actuate the release mechanism 101 to open the sliding door 10.

Figure 7:
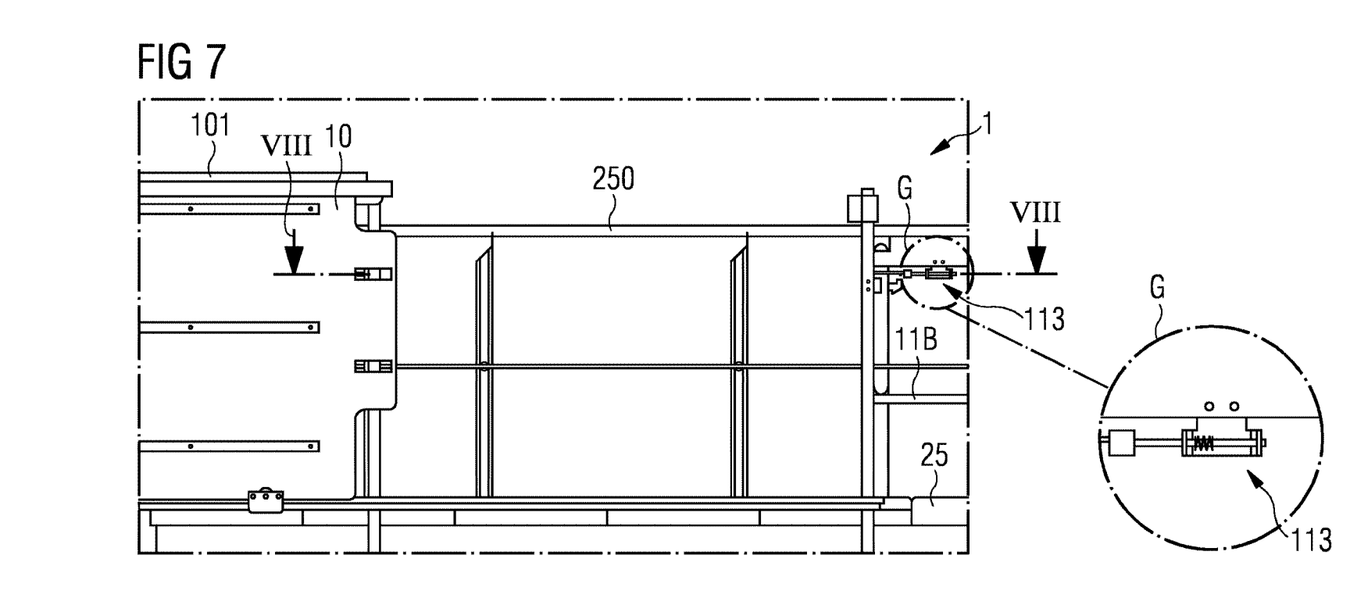
FIG. 7 shows another stage of the method during a hoisting procedure.
Figure 8:
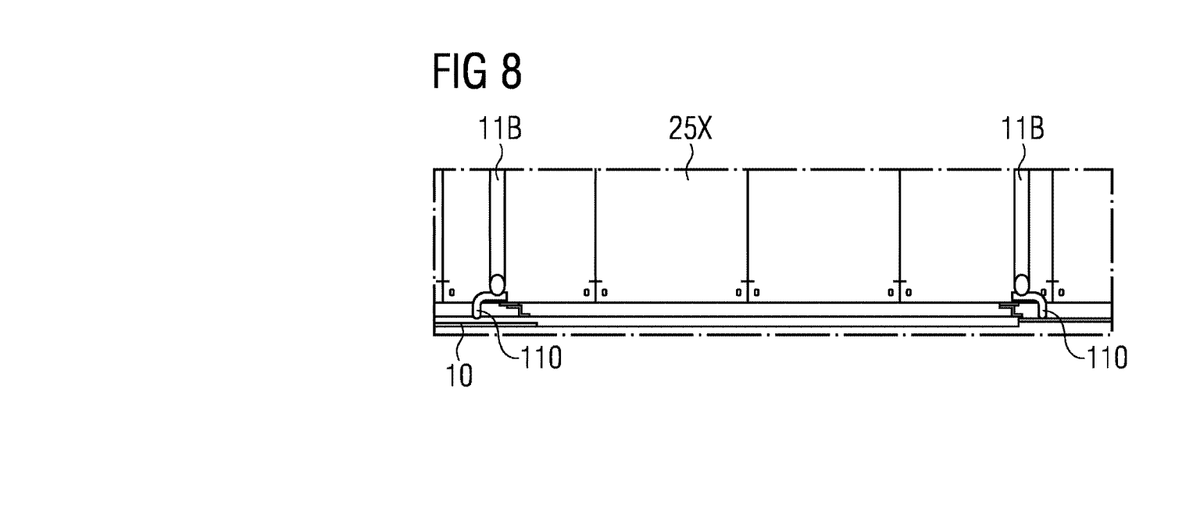
FIG. 8 shows another stage of the method during a hoisting procedure.

FIG. 7 is a side view of the safety door assembly 1, and the canopy wall and hoist window are not shown for the sake of clarity. FIG. 8 shows the cross-section F-F. The enlarged portion G indicates a spring-loaded release mechanism 113 for the barrier 11B on the left of the hoist window (when viewed from inside the canopy) which is manually actuated to release the barrier 11B from its "parked" position, allowing it to be moved to its closed position. A similar mechanism may be assumed to be present for the other barrier 11B (to the right of the hoist window when viewed from inside the canopy) to release it from its "parked" position.

The diagrams show how the fully opened sliding door 10 prevents a barrier 11B from being returned to its open position. This is because the body of the sliding door 10 (shown here from behind) effectively blocks the locking mechanism 110 of the barrier 11B (on the left-hand side of the diagram), so that the barrier 11B cannot be turned to its open position. The other barrier 11B (on the right-hand side of this diagram) is also prevented from turning by the spring-loaded latch that now blocks its locking mechanism 110.

Figure 9:
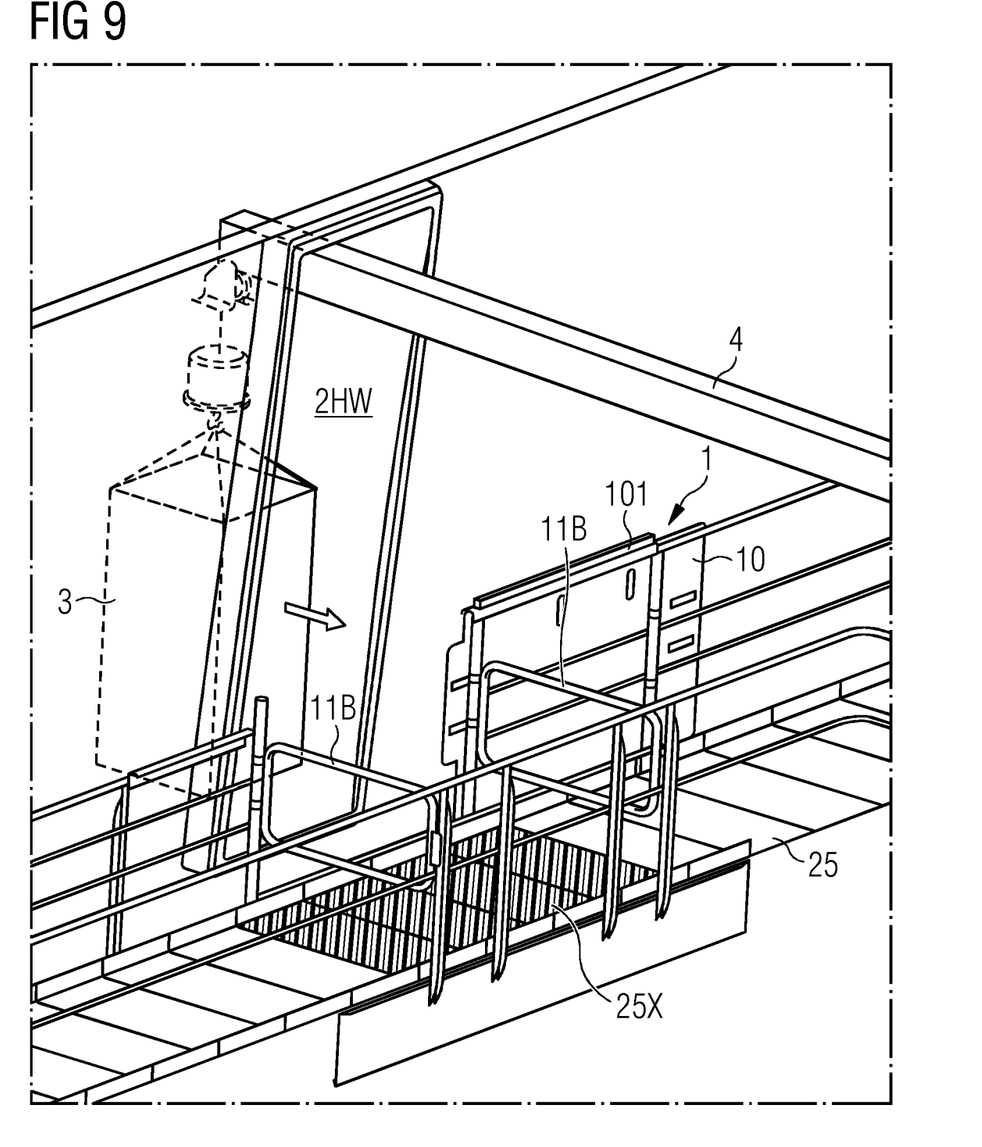
FIG. 9 shows another stage of the method during a hoisting procedure.
Figure 10:
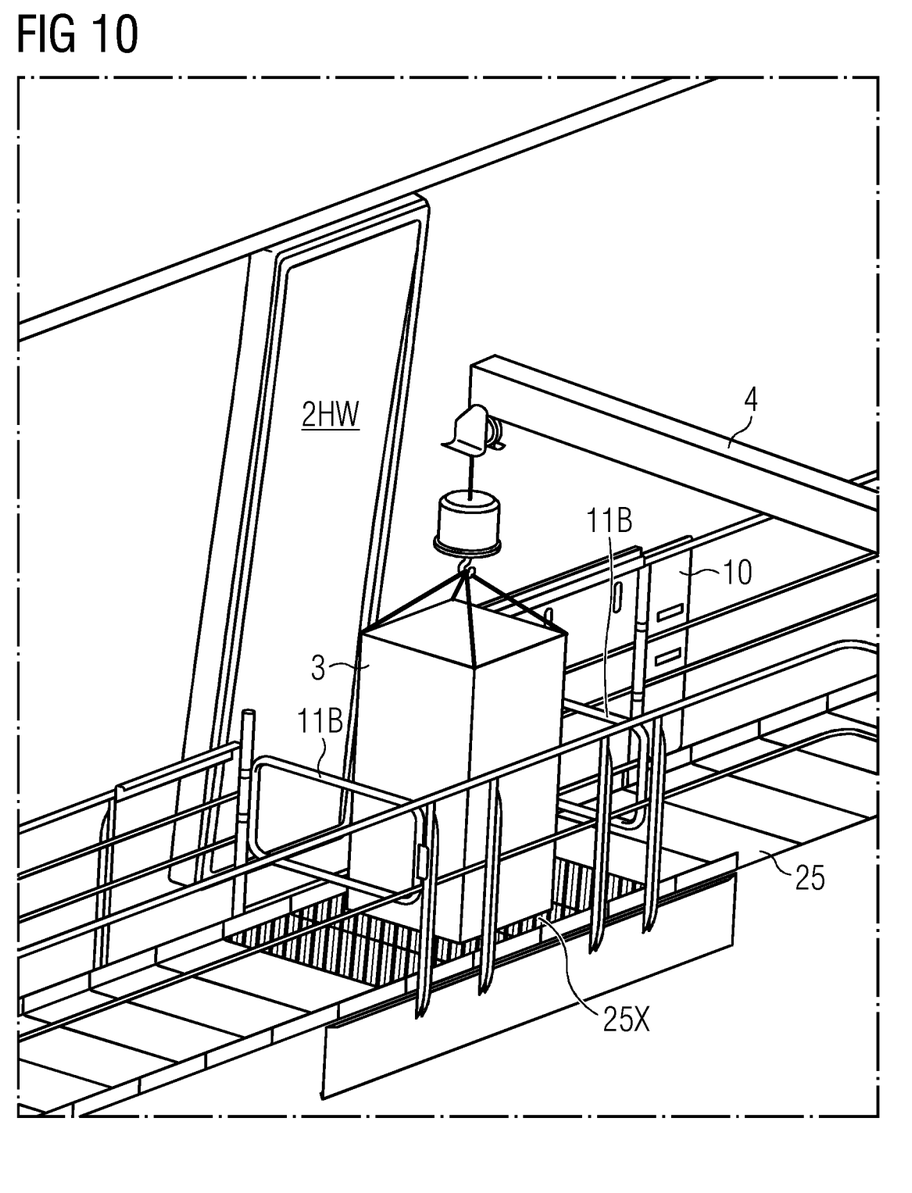
FIG. 10 shows another stage of the method during a hoisting procedure.
Figure 11:
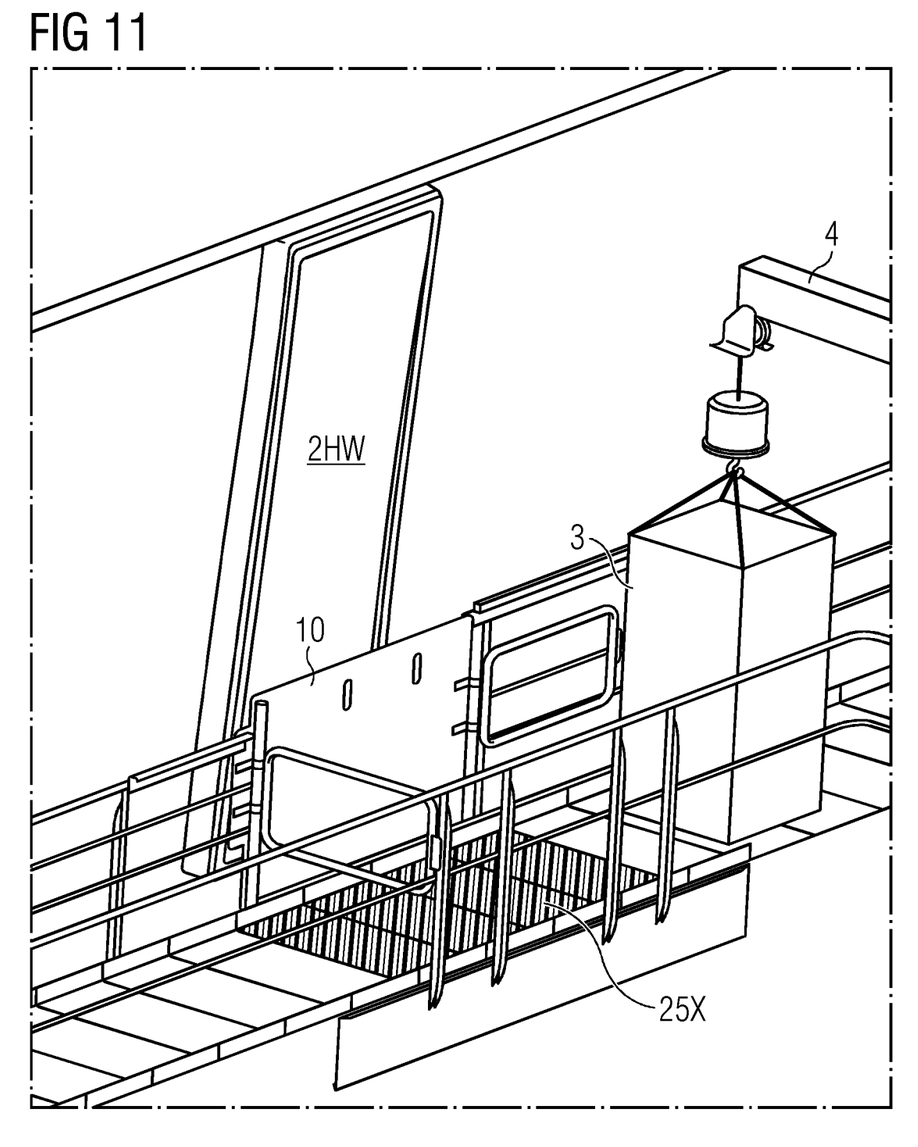
FIG. 11 shows another stage of the method during a hoisting procedure.

With both barriers 11B closed and the sliding door open, the hazard area 25X is now inaccessible to personnel, and the hoisting procedure can continue safely as shown in FIGS. 9-11, which illustrate how the load 3 may be lifted in through the hoist window 2HW and onto the platform 25. The operator can then close the sliding door 10, and then open the right-hand barrier 11B as shown in FIG. 11 to allow the load to be moved outside of the hazard area 25X. The other barrier 11B can then also be opened to once again give free passage to anyone on the walkway 25.

Figure 12:
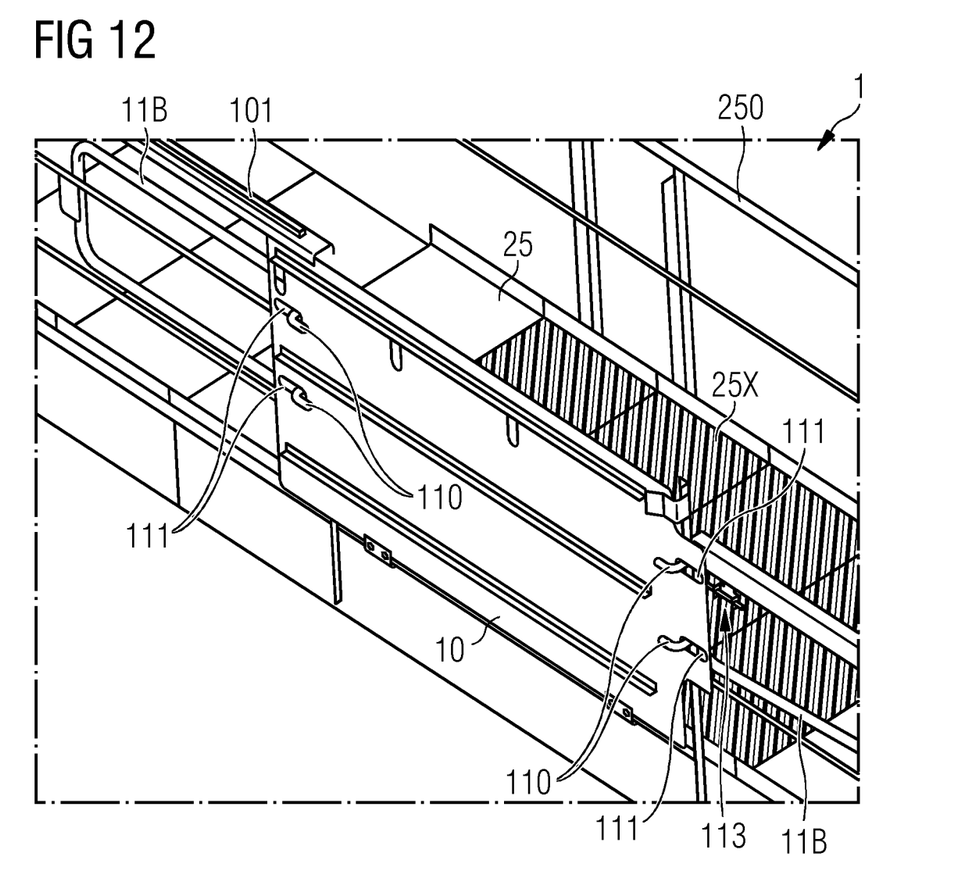
FIG. 12 shows another stage of using an embodiment of the safety door assembly during a hoisting procedure.

FIG. 12 shows another view of the safety door assembly 1 from behind, showing the barriers 11B of the barrier assembly 11 in their open position. As shown in FIGS. 7 and 8, the locking mechanism 110 is realized as a pair of flat hooks that pass through horizontal slits 111 formed in the body of the sliding door 10. FIGS. 7 and 8 were used to explain how the opened sliding door 10 prevents a closed barrier from being opened; this diagram shows how the locking mechanism 110 of a barrier 11B engages with the sliding door 10 in its closed position, preventing the sliding door 10 from being opened.

Figure 13:
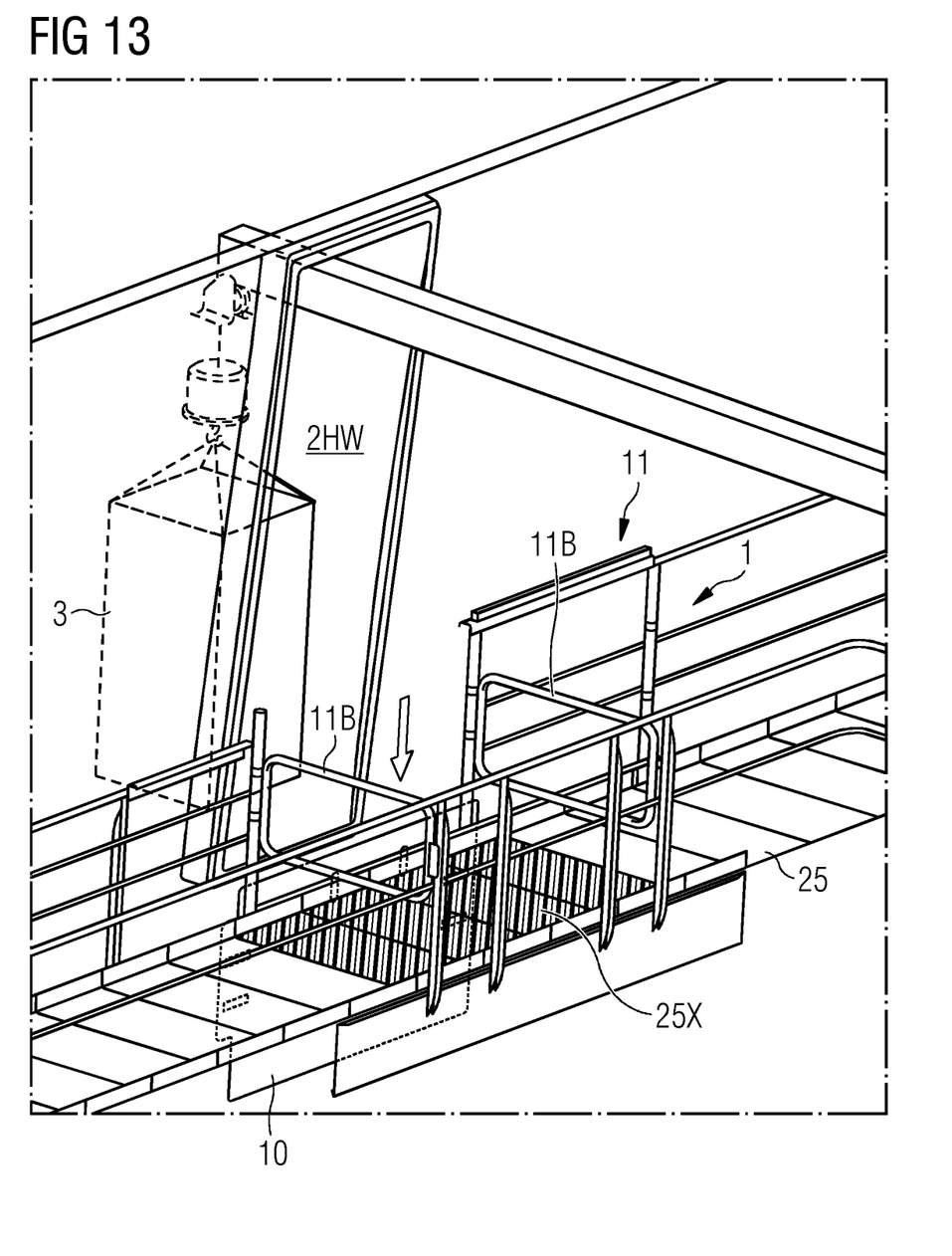
FIG. 13 shows an alternative approach to the safety door assembly.
Figure 14:
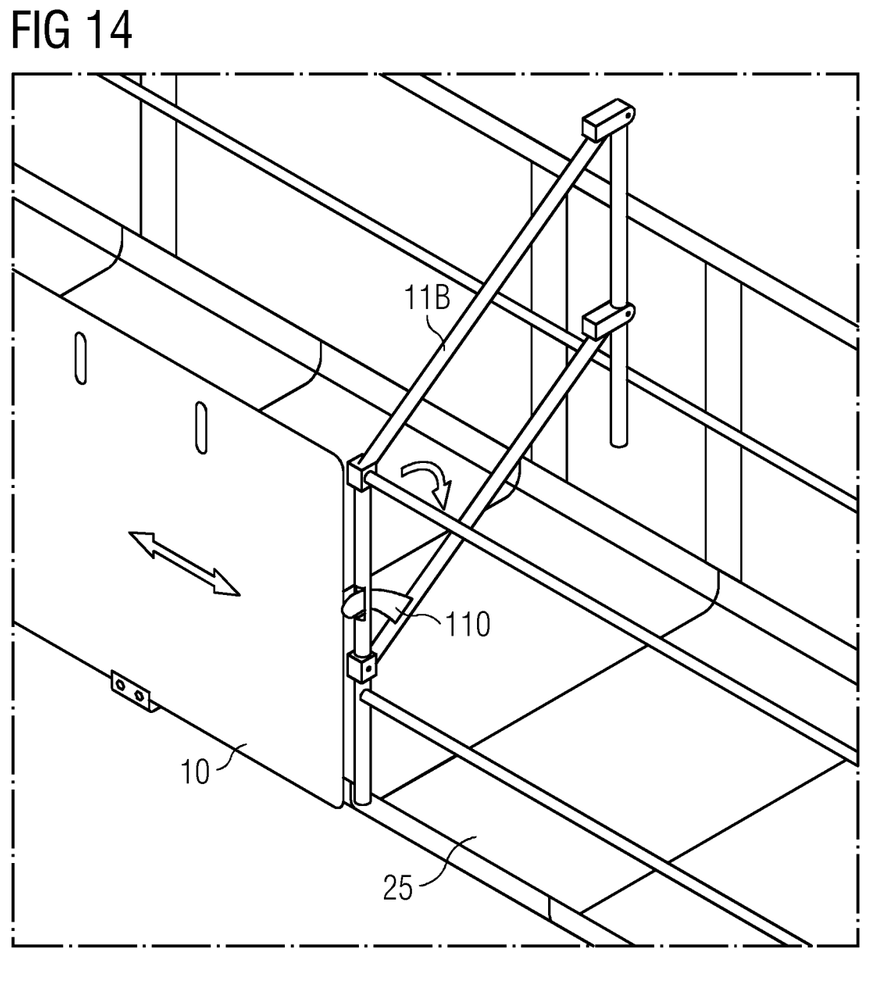
FIG. 14 shows another alternative approach to the inventive safety door assembly.

FIGS. 13 and 14 show alternative approaches to implementing the inventive safety door assembly. In FIG. 13, the safety door assembly 1 deploys a sliding door 10 that can move vertically as indicated by the arrow. The diagram shows the sliding door 10 in its open position, allowing a load 3 to be moved through the hoist window 2HW during a lifting maneuver. The barrier assembly 11 can be the same in principle as the barrier assembly described above, and any locking means and/or actuating means can be adapted as appropriate so that the sliding door 10 cannot be moved downwards unless both barriers 11B are closed as shown here; and neither barrier 11B can be turned to its parking position unless the sliding door has been pulled up to its closed position.

In FIG. 14, instead of swinging sideways, the barriers 11B can move vertically. The diagram shows a barrier 11B being moved from its open position, unfolding downwards towards its closed position. The other barrier 11B may be assumed to be the same. The diagram shows the sliding door 10 in its closed position, and it cannot move horizontally until both barriers 11B are fully closed, i.e. fully unfolded. Here also, a locking means 110 ensures that the sliding door 10 cannot be opened unless both barriers 11B are closed; and neither barrier 11B can be returned to its upright open position unless the sliding door 10 is correctly closed.

Figure 15:
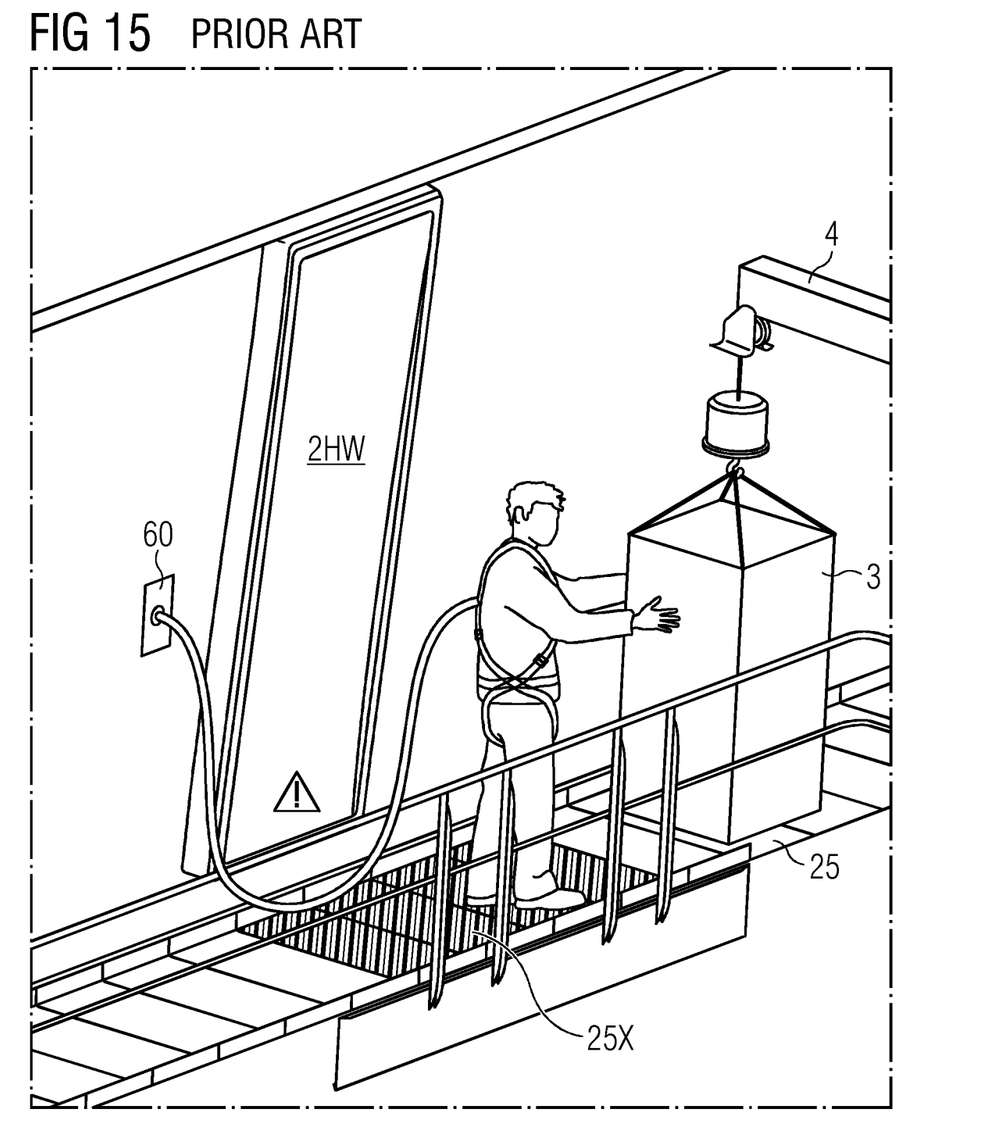
FIG. 15 shows a stage during a prior art hoisting procedure.

FIG. 15 shows a stage during a prior art hoist procedure. The diagram shows a hoist window 2HW in a wind turbine canopy 20. A platform 25 extends along the inside wall of the wind turbine canopy 20 and can be used by personnel 5 at various stages of a lifting maneuver. The diagram shows a load 3 deposited on the platform 25, and a person 5 attaching a lifting apparatus 4 to the load 3. To avoid serious injury, he must wear a safety harness 6 which in turn must be securely attached by means of a rope or cable to a fixture 60 inside the canopy 20. This safety measure is important, but the harness and rope can also hamper his movements and can significantly prolong the duration of the overall lifting maneuver.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A safety door assembly for a hoist window of a structure, the safety door assembly comprising:
   a sliding door arranged to reveal or conceal the hoist window in an essentially vertical wall of the structure; and
   a barrier assembly which is closed to inhibit access to an area in front of the hoist window or opened to permit access to the area in front of the hoist window;
   wherein the barrier assembly is configured to prevent the sliding door from revealing the hoist window when the barrier assembly is open, and the sliding door is configured to prevent opening of the closed barrier assembly when the sliding door reveals the hoist window.

2. The safety door assembly according to claim 1, comprising an actuating means for actuating the sliding door, the actuating means being arranged to be inaccessible from a position in front of the hoist window.

3. The safety door assembly according to claim 2, wherein the actuating means comprises a lever which, when raised, allows the sliding door to be moved to reveal the hoist window.

4. The safety door assembly according to claim 3, wherein the lever, when lowered, prevents movement of the sliding door.

5. The safety door assembly according to claim 1, wherein the barrier assembly comprises a pair of barriers arranged on either side of the hoist window.

6. The safety door assembly according to claim 5, wherein the pair of barriers are independently operable between an open position and a closed position.

7. The safety door assembly according to claim 1, wherein the barrier assembly extends across a passageway when closed.

8. The safety door assembly according to claim 1, wherein the barrier assembly comprises a locking means configured to engage with the sliding door when the barrier assembly is in an open position.

9. The safety door assembly according to claim 8, wherein the locking means comprises a hook, and the sliding door comprises an aperture shaped to receive the locking means when the sliding door is in a closed position.

10. The safety door assembly according to claim 1, wherein the barrier assembly comprises a latch configured to engage with a railing of a passageway when the barrier assembly is in a closed position.

11. A wind turbine comprising
   a canopy mounted at a top of a tower and enclosing components of the wind turbine; and
   a hoist window to facilitate transfer of loads into and out of the wind turbine, and the safety door assembly according to claim 1 for the hoist window.

12. The wind turbine according to claim 11, wherein the hoist window is located in a side wall of the canopy.

13. The wind turbine according to claim 11, wherein the hoist window is located in a tower wall.

14. The wind turbine according to claim 11, comprising a passageway beneath the hoist window, wherein a width of the passageway corresponds to a width of a barrier of the barrier assembly.

15. A method of performing a hoisting procedure in a structure comprising a hoist window to facilitate a transfer of a load between an interior and an exterior of the structure and comprising the safety door assembly according to claim 1, the method comprising:
   A) closing the barrier assembly to inhibit personnel access to the area in front of the hoist window;
   B) actuating the sliding door to reveal the hoist window;
   C) operating a lifting apparatus to transfer the load through the opened hoist window;
   D) actuating the sliding door to conceal the hoist window; and
   E) opening the barrier assembly to permit personnel access once again to the area in front of the closed hoist window.

16. The safety door assembly according to claim 1, wherein the sliding door is oriented essentially vertically, and slides horizontally to move from an open position to a closed position.

* * * * *